(12) United States Patent
Chiu et al.

(10) Patent No.: US 10,106,965 B2
(45) Date of Patent: Oct. 23, 2018

(54) TOUCH SPRAY HEAD

(71) Applicant: Globe Union Industrial Corp., Taichung (TW)

(72) Inventors: Huiling Chiu, Taichung (TW); Chiahua Yuan, Taichung (TW); Yiping Lin, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 197 days.

(21) Appl. No.: 15/189,087

(22) Filed: Jun. 22, 2016

(65) Prior Publication Data

US 2017/0058496 A1    Mar. 2, 2017

(30) Foreign Application Priority Data

Aug. 25, 2015 (TW) .................................. 104127758

(51) Int. Cl.
*E03C 1/05* (2006.01)
*E03C 1/04* (2006.01)
(Continued)

(52) U.S. Cl.
CPC ................ *E03C 1/057* (2013.01); *B05B 1/02* (2013.01); *B05B 1/14* (2013.01); *B05B 1/185* (2013.01); *B05B 12/002* (2013.01); *E03C 1/04* (2013.01); *E03C 1/0404* (2013.01); *E03C 1/0405* (2013.01); *E03C 1/086* (2013.01);
(Continued)

(58) Field of Classification Search
CPC ................... E03C 1/0404; E03C 1/084; E03C 2001/0415; E03C 2001/0417; E03C 1/057; E03C 1/04; E03C 1/0405; E03C 1/086; E03C 2001/026; Y10T 137/9464;
(Continued)

(56) References Cited

U.S. PATENT DOCUMENTS 8,424,781 B2 * 4/2013 Rosko ................... B05B 1/1609
239/446
9,175,459 B2 * 11/2015 Zhang ................... B05B 1/1618
(Continued)

FOREIGN PATENT DOCUMENTS

TW    I228578 B    3/2005
TW    M382408 U   6/2010
(Continued)

*Primary Examiner* — Marina Tietjen
*Assistant Examiner* — Frederick D Soski
(74) *Attorney, Agent, or Firm* — Alan D. Kamrath; Kamrath IP Lawfirm, P.A.

(57) ABSTRACT

A touch spray head is in connection with a water supply segment of a water supply pipe which is accommodated in a body of a faucet and includes a water channel, the touch spray head and the water supply pipe are pulled out of and retracted back to an outlet of the body, and the touch spray head contains: a casing, a positioning member, a control valve, and an actuation device. The casing includes a hole arranged thereon, the positioning member includes at least one first through orifice, and each of the at least one first through orifice communicates with the water channel and the hole. The control valve includes a movable stem configured to turn on the control valve, and the actuation device partially exposes outside the casing and is operated by a user so as to urge the movable stem of the control valve to move.

9 Claims, 13 Drawing Sheets

(51) Int. Cl.
*E03C 1/086* (2006.01)
*E03C 1/02* (2006.01)
*B05B 1/02* (2006.01)
*B05B 1/14* (2006.01)
*B05B 1/18* (2006.01)
*B05B 12/00* (2018.01)
*F16K 21/06* (2006.01)
*F16K 31/44* (2006.01)

(52) U.S. Cl.
CPC .............. *F16K 21/06* (2013.01); *F16K 31/44* (2013.01); *E03C 2001/026* (2013.01); *E03C 2001/0415* (2013.01); *Y10T 137/9464* (2015.04)

(58) Field of Classification Search
CPC .. B05B 1/02; B05B 1/14; B05B 1/185; B05B 12/002; F16K 21/06; F16K 31/44
See application file for complete search history.

(56) References Cited

U.S. PATENT DOCUMENTS

| | | | | |
|---|---|---|---|---|
| 9,707,572 | B2* | 7/2017 | Erickson | B05B 1/1618 |
| 2002/0185553 | A1* | 12/2002 | Benstead | B05B 1/1618 |
| | | | | 239/428.5 |
| 2004/0112985 | A1* | 6/2004 | Malek | B05B 1/1618 |
| | | | | 239/445 |
| 2011/0049273 | A1* | 3/2011 | Huang | B05B 1/1618 |
| | | | | 239/588 |

FOREIGN PATENT DOCUMENTS

| | | |
|---|---|---|
| TW | M432670 | 7/2012 |
| TW | I369459 B | 8/2012 |
| TW | M452280 U | 5/2013 |

* cited by examiner

TOUCH SPRAY HEAD

FIELD OF THE INVENTION

The present invention relates to a faucet assembly, and more particularly to a touch spray head adapted for the faucet assembly.

BACKGROUND OF THE INVENTION

A conventional control valve for a spray head of a faucet is manufactured at high cost and is complicated. Accordingly, improved touch control valves were disclosed in TW Patent Nos. M432670, 1228578, I369459, M452280 and M382408, respectively. The improved touch control valves are an automatic valve or a manual valve, wherein when the touch control valves are the manual valve, water supply is stopped by touching an actuation element, after starting the water supply. When the touch control valves are the automatic valve, the water supply is stopped automatically by way of water pressure change after a period of using time.

In addition, one touch control valves are sold by many companies, such as 3M, wherein each one touch control valve is fixed on an outlet of the faucet and the water supply is started or stopped by manually touching an actuation element in the control valve, thus causing contamination to the actuation element.

A conventional faucet contains a handle and a central shaft driven by the handle so as to control water supply or to adjust temperature of the water supply. But an operation travel is too long to operate the faucet smoothly and to obtain aesthetics appearance of the control valve.

A conventional pull-out or pull-down spray head contains an infrared sensor for sensing user's hand, yet the pull-out or pull-down spray head cannot be controlled as the infrared sensor or a circuit board is broken.

The present invention has arisen to mitigate and/or obviate the afore-described disadvantages.

SUMMARY OF THE INVENTION

The primary objective of the present invention is to provide a touch spray head which is capable of overcoming the shortcomings of the conventional spray head.

To obtain the above objective, a touch spray head provided by the present invention is in connection with a water supply segment of a water supply pipe which is accommodated in a body of a faucet and includes a water channel. The touch spray head and the water supply pipe are pulled out of and retracted back to an outlet of the body, and the touch spray head contains: a casing, a positioning member, a control valve, and an actuation device.

The casing is configured to be held and pulled by a user and includes a hole arranged thereon.

The positioning member is secured in the casing and includes at least one first through orifice formed thereon, and each of the at least one first through orifice communicates with the water channel of the water supply pipe and the hole of the casing.

The control valve is housed in the positioning member and includes a movable stem configured to turn on the control valve, such that water flows to the at least one first through orifice of the positioning member from the water channel of the house via the control valve.

The actuation device partially exposes outside the casing and is operated by the user so as to urge the movable stem of the control valve to move.

Thereby, when the control valve is an automatic valve and its movable stem is urged to move and turn on the control valve, the movable stem moves back to its original position so as to turn off the control valve after a period of using time, thus stopping water supply automatically. When the control valve is a manual valve, the press members are pressed by the user so as to turn off the control valve after a period of using time, thus stopping the water supply.

Preferably, the control valve starts and stops the water supply randomly by way of the movable stem, after pressing the press members, thus saving water consumption and operating the touch spray head easily.

Furthermore, the press members are pressed by the user to drive the control valve, hence the control valve is not directly touched by the user so as to avoid pollution of the water flowing through the control valve.

The water is guided to the water spray assembly by using the control valve, and the switching valve assembly is pressed so that the water is guided to flow out of the central nozzle of the water spray assembly or to flow out of the multiple peripheral nozzles of the water spray assembly.

DETAILED DESCRIPTION OF THE PREFERRED EMBODIMENTS

With reference to FIGS. 1-5, a touch spray head 1 according to a first embodiment of the present invention is mounted on a pull-down faucet which is fixed in a kitchen or a bathroom, for example, the touch spray head 1 is in connection with a water supply segment 2a of a water supply pipe 2 of the pull-down faucet, and the water supply pipe 2 is accommodated in a body 3 of the pull-down faucet and includes a water channel 2b defined therein. The touch spray head 1 and the water supply pipe 2 are pulled out of and retracted back to an outlet 3a of the body 3, and the touch spray head 1 comprises: a casing 10, a positioning member 20, a control valve 30, and an actuation device 40.

The casing 10 is configured to be held and pulled by a user and includes a hole 11 arranged thereon.

Figure 6:
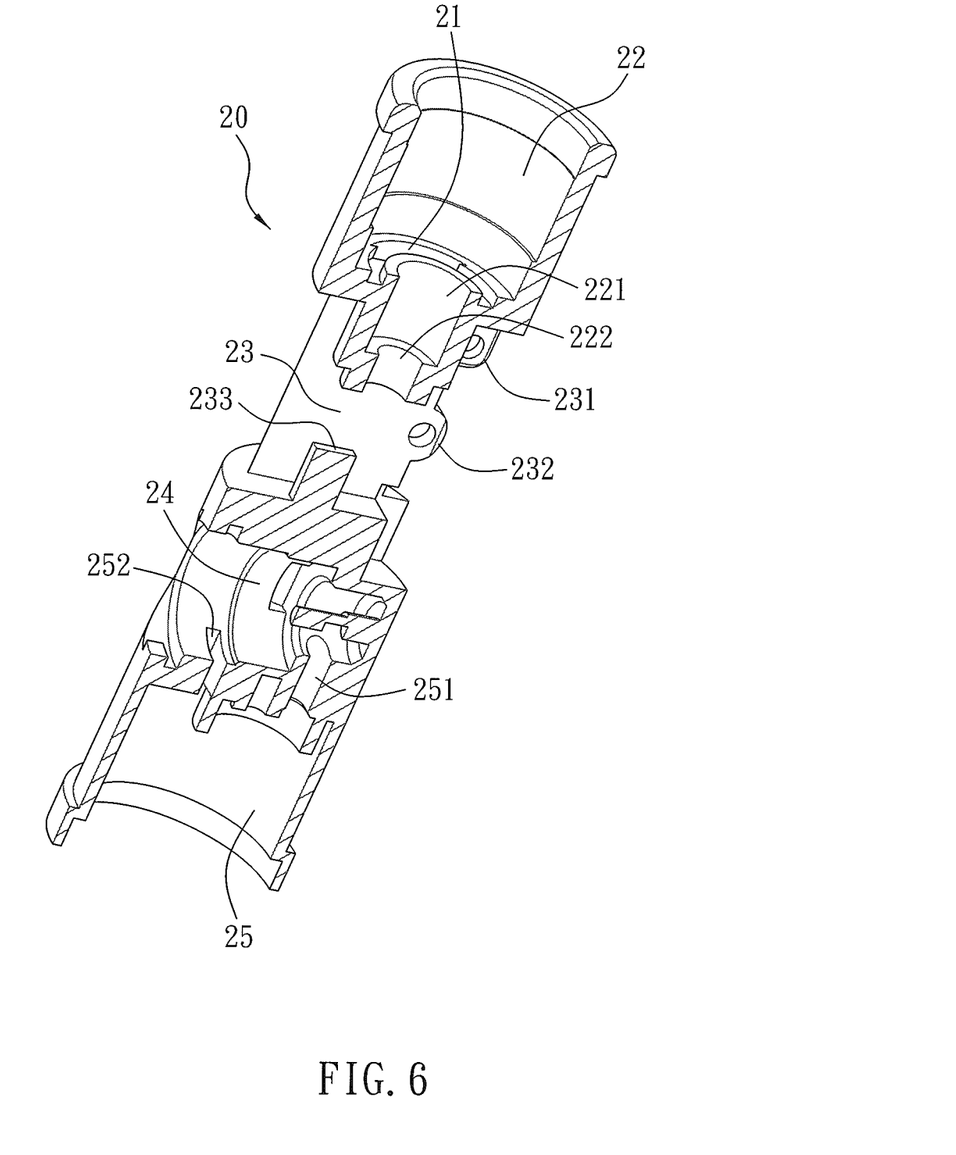
FIG. 6 is a cross-sectional perspective view showing the assembly of a positioning member of the touch spray head according to the first embodiment of the present invention.
Figure 7:
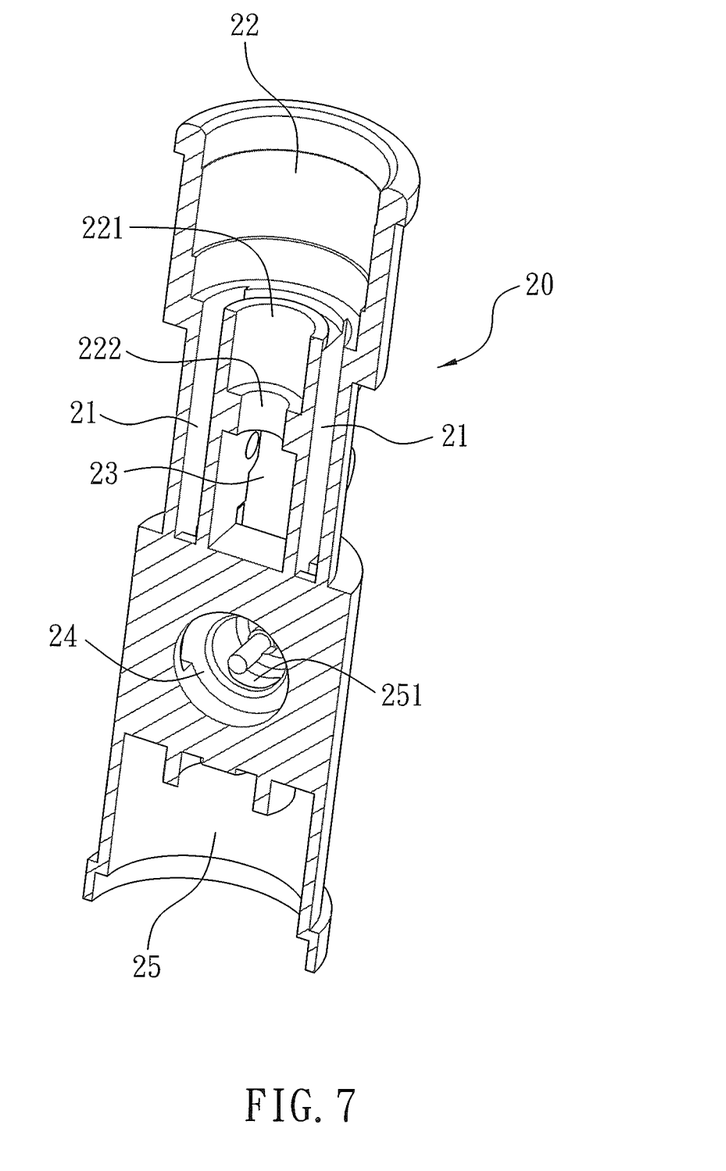
FIG. 7 is another cross-sectional perspective view showing the assembly of the positioning member of the touch spray head according to the first embodiment of the present invention.

The positioning member 20, as shown in FIGS. 6 and 7, is secured in the casing 10 and includes at least one first through orifice 21 formed thereon, wherein each of the at least one first through orifice 21 communicates with the water channel 2b of the water supply pipe 2 and the hole 11 of the casing 10. In this embodiment, the positioning member 20 includes two first through orifices 21 formed therein.

The control valve 30 is housed in the positioning member 20 and includes a movable stem 31 configured to turn on the control valve 30, such that water flows to the at least one first through orifice 21 of the positioning member 20 from the water channel 2b of the house 2 via the control valve 30.

The actuation device 40 partially exposes outside the casing 10 and is operated by the user so as to urge the movable stem 31 of the control valve 30 to move.

In this embodiment, the positioning member 20 includes an accommodation chamber 22, a housing groove 221 defined on a bottom of the accommodation chamber 22, and an aperture 222 passing through a bottom of the housing groove 221. The control valve 30 is housed in the accommodation chamber 22 of the positioning member 20, and the movable stem 31 inserts into the housing groove 221. The control valve 30 further includes a push post 301 extending out of the housing groove 221 via the aperture 222, such that the actuation device 40 urges the push post 301 to move the movable stem 31.

Figure 8:
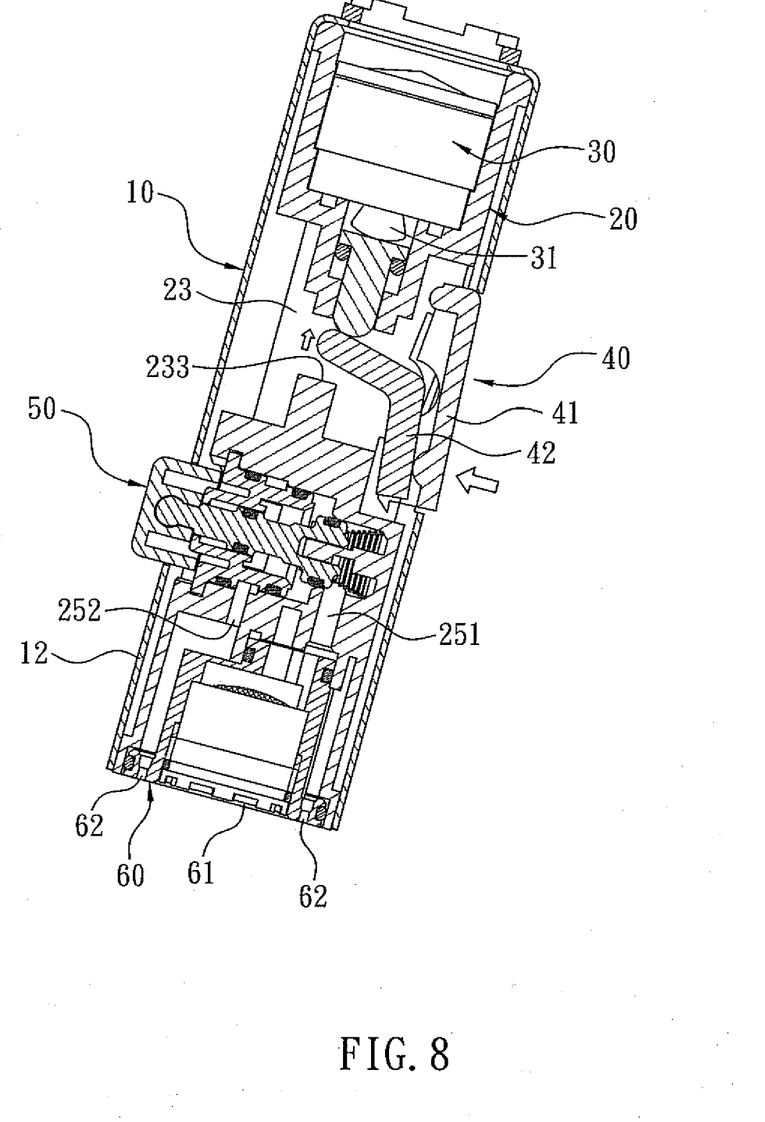
FIG. 8 is a cross sectional view showing the operation of an actuation device of the touch spray head according to the first embodiment of the present invention.
Figure 9:
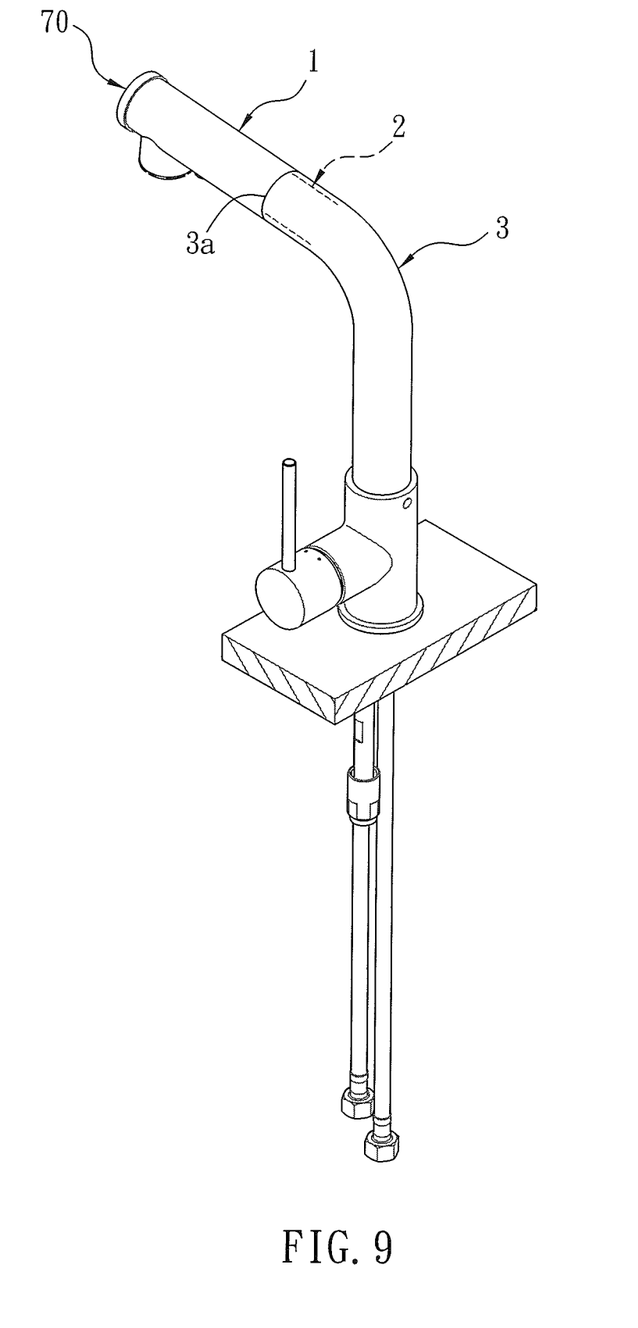
FIG. 9 is a perspective view showing the application of a touch spray head according to a second embodiment of the present invention.
Figure 10:
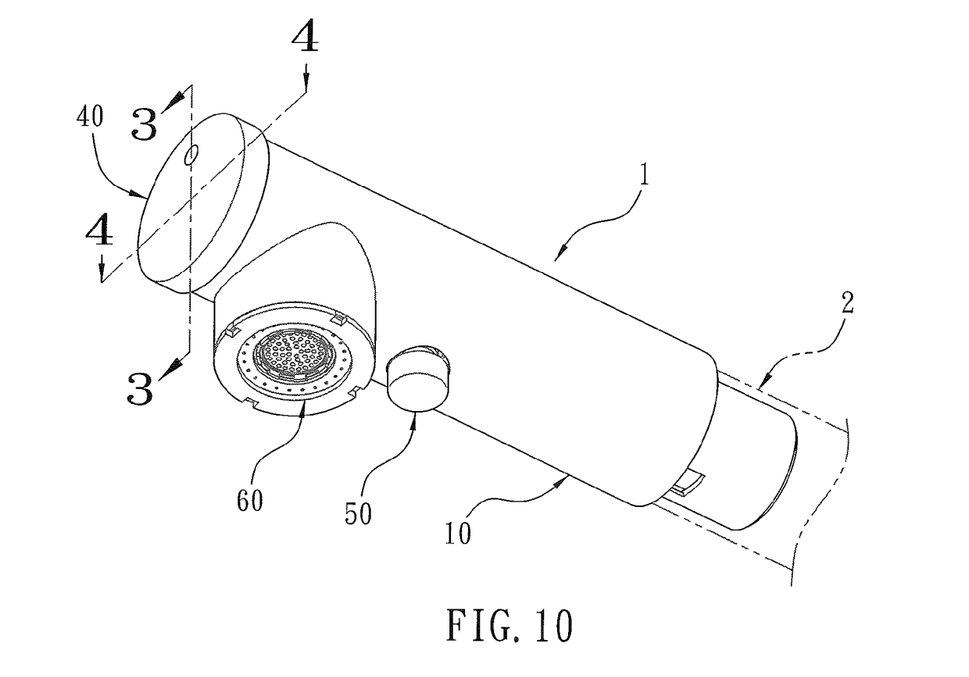
FIG. 10 is a perspective view showing the assembly of the touch spray head according to the second embodiment of the present invention, wherein a dotted line denotes a water supply pipe which connects with the touch spray head.
Figure 11:
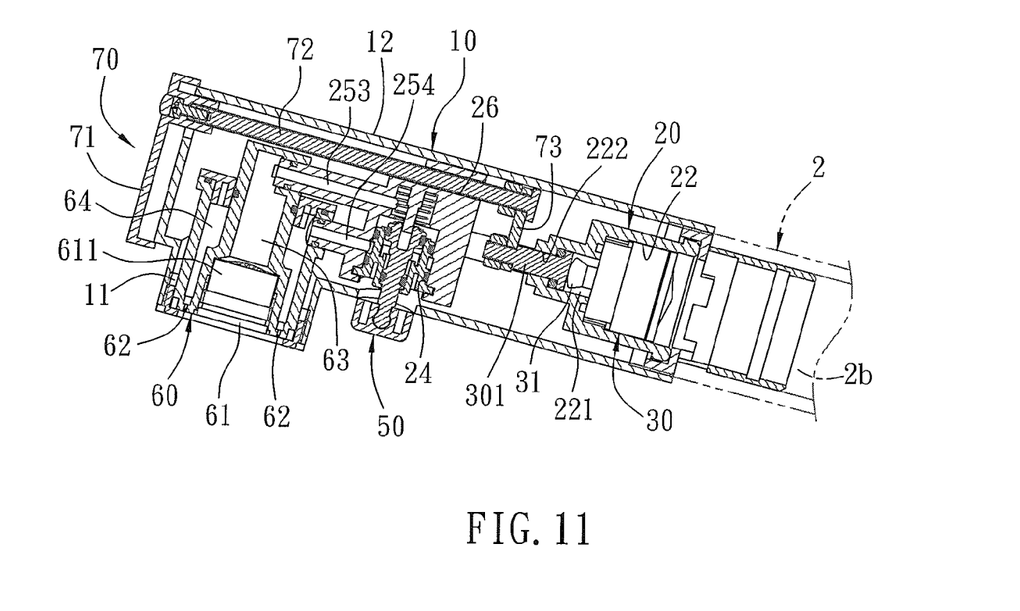
FIG. 11 is a cross sectional view taken along the line 3-3 of FIG. 10.
Figure 12:
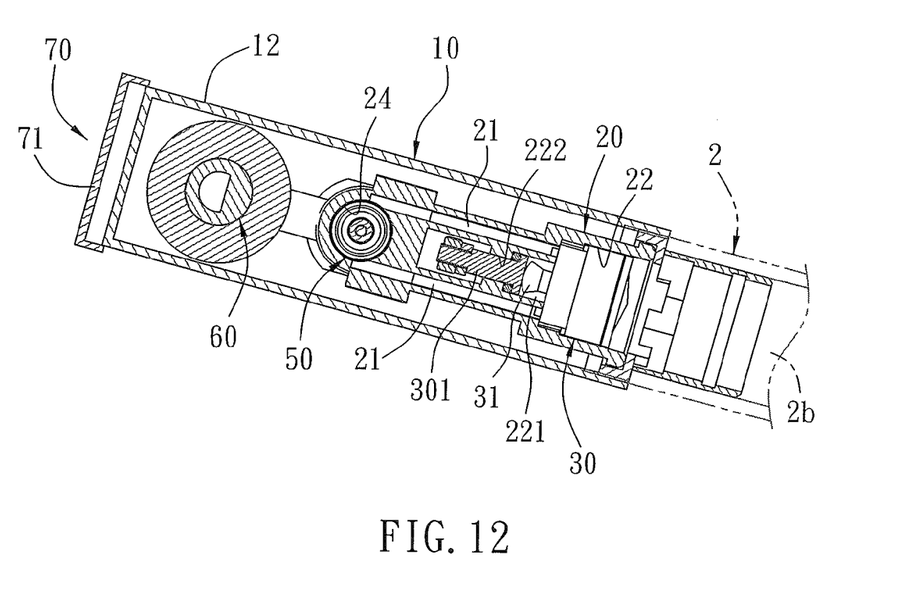
FIG. 12 is a cross sectional view taken along the line 4-4 of FIG. 10.
Figure 13:
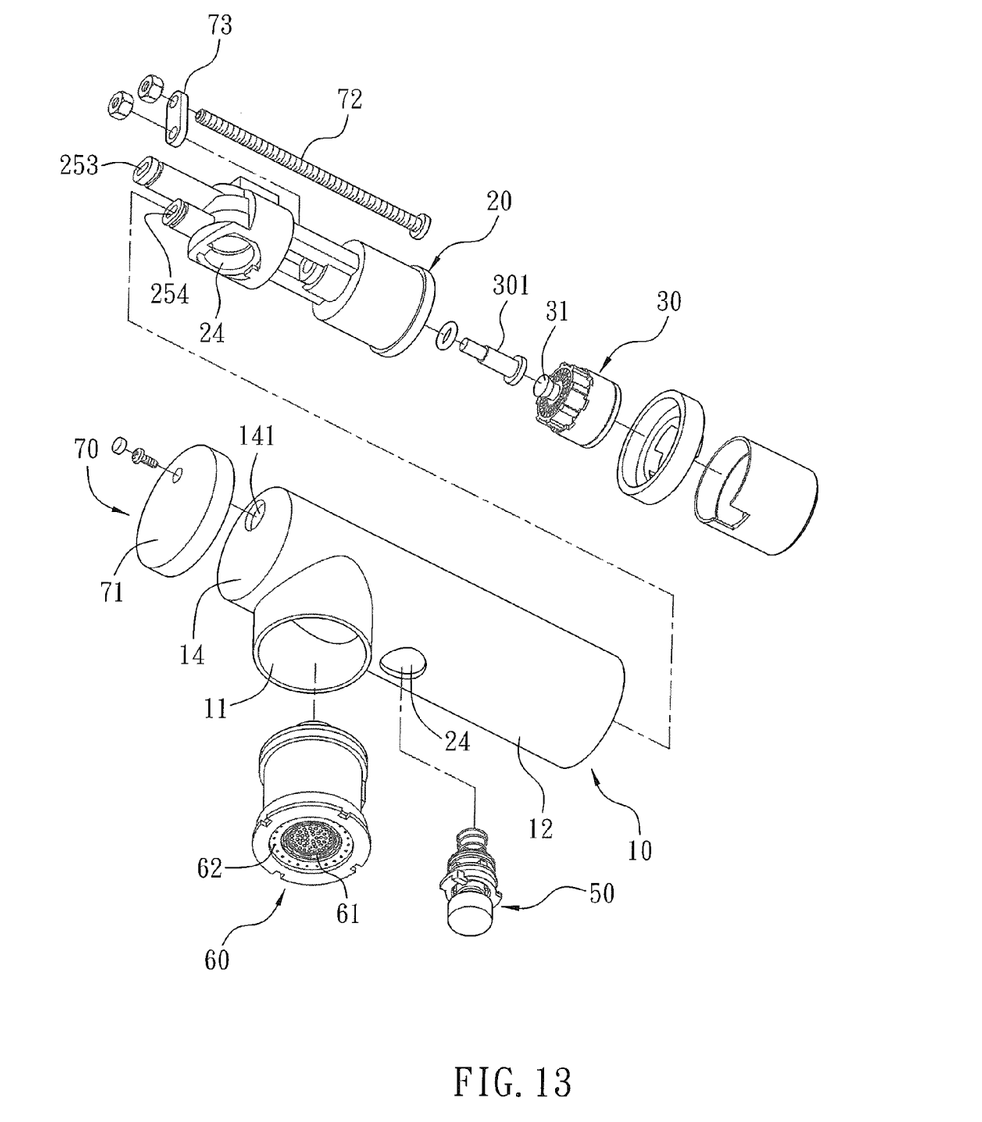
FIG. 13 is a perspective view showing the exploded components of the touch spray head according to the second embodiment of the present invention.
Figure 14:
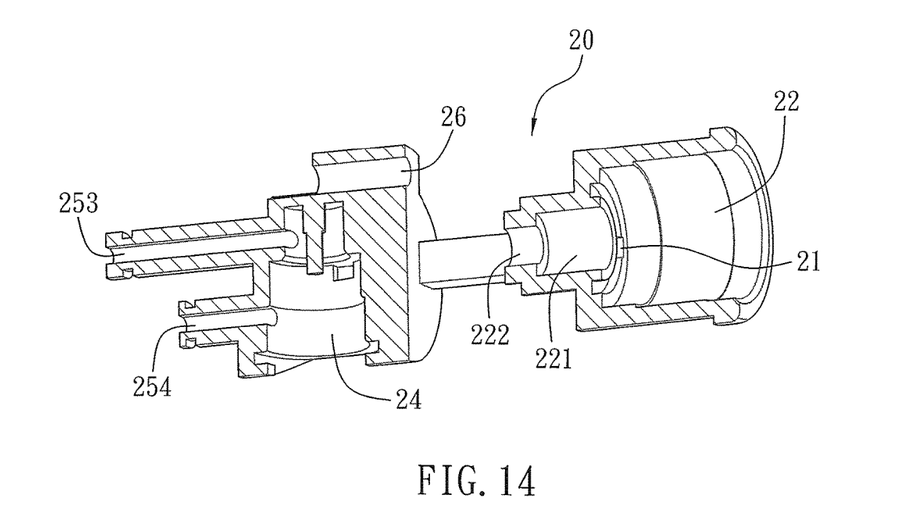
FIG. 14 is a cross-sectional perspective view showing the assembly of a positioning member of the touch spray head according to the second embodiment of the present invention.
Figure 15:
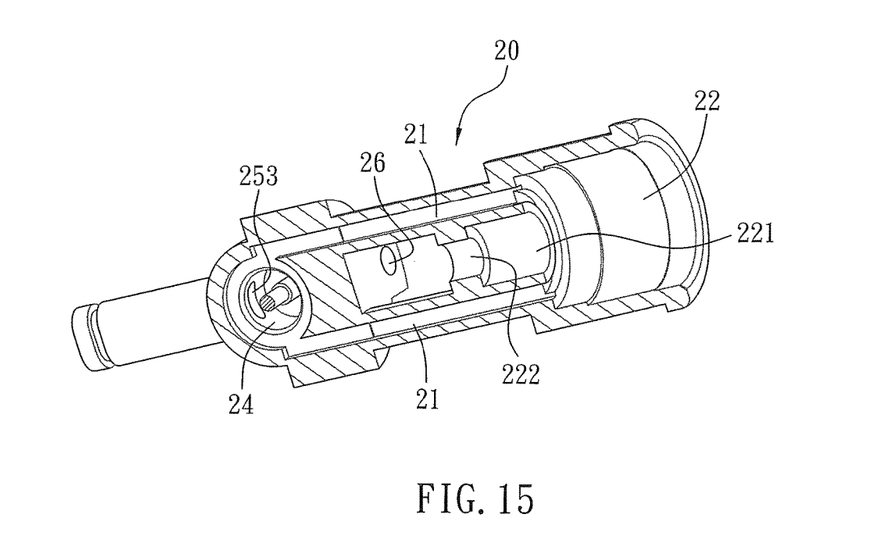
FIG. 15 is another cross-sectional perspective view showing the assembly of the positioning member of the touch spray head according to the second embodiment of the present invention.

The actuation device 40 includes a press member 41 and a driving member 42, wherein a first end of the press member 41 is rotatably connected with the positioning member 20, and a second end of the press member 41 is limited in the casing 10; wherein an intermediate portion of the driving member 42 is rotatably coupled with the positioning member 20, a first end of the driving member 42 is abutted by the press member 41, and a second end of the driving member 42 pushes the push post 301, as illustrated in FIG. 8.

The casing 10 includes a peripheral fence 12, an opening 13 formed on the peripheral fence 12 so that a part of the press member 41 extends out of the opening 13 to be pressed by the user.

Figure 1:
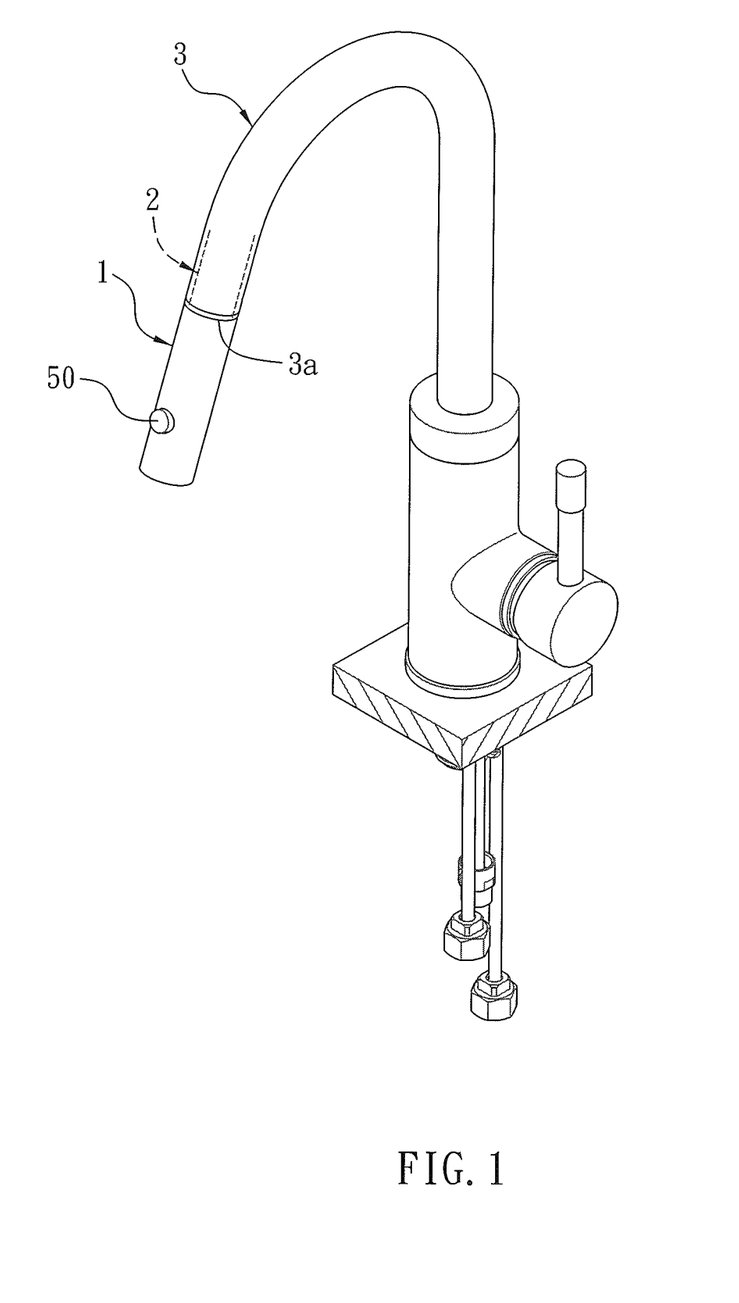
FIG. 1 is a perspective view showing the application of a touch spray head according to a first embodiment of the present invention.
Figure 2:
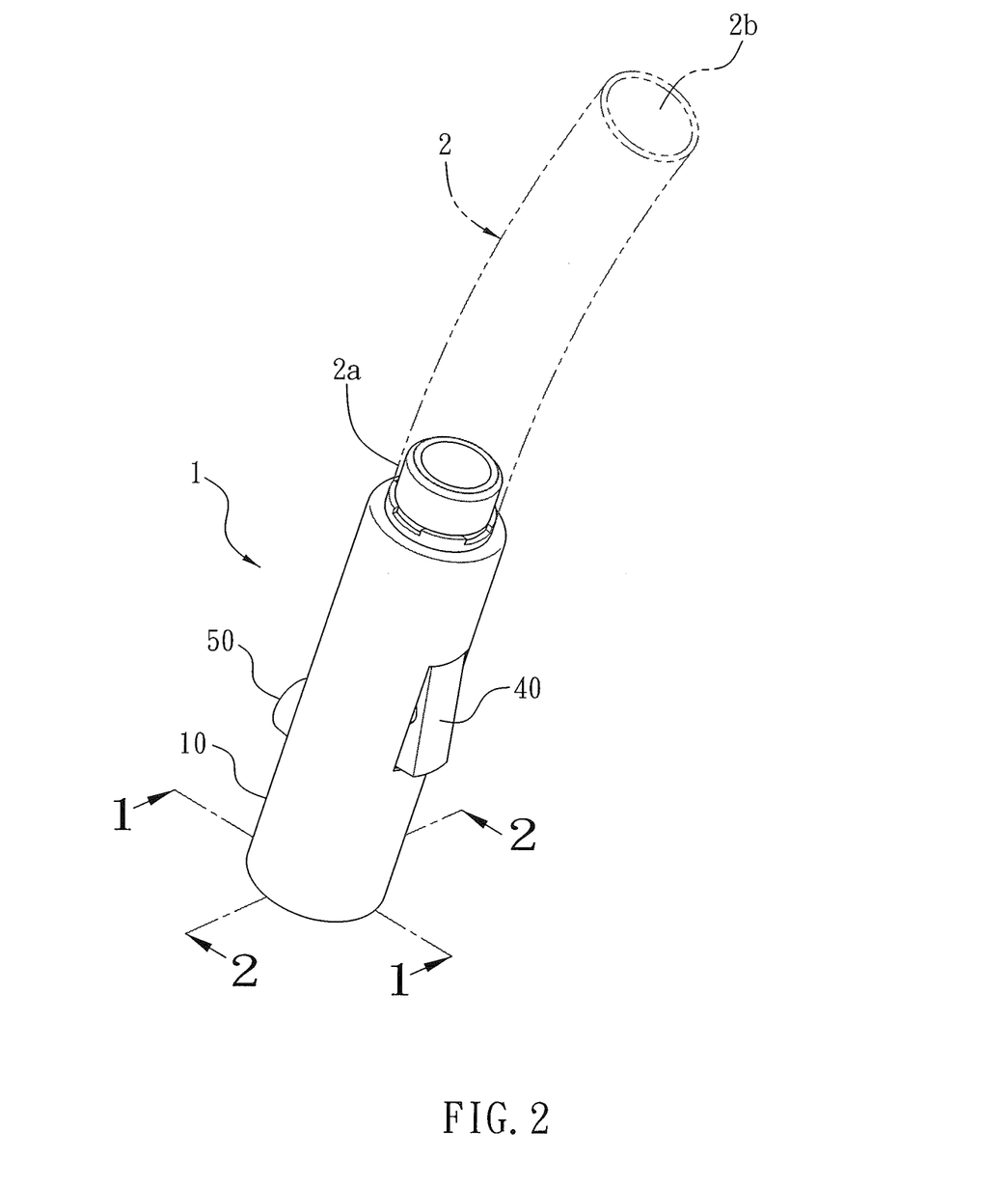
FIG. 2 is a perspective view showing the assembly of the touch spray head according to the first embodiment of the present invention, wherein a dotted line denotes a water supply pipe which connects with the touch spray head.
Figure 3:
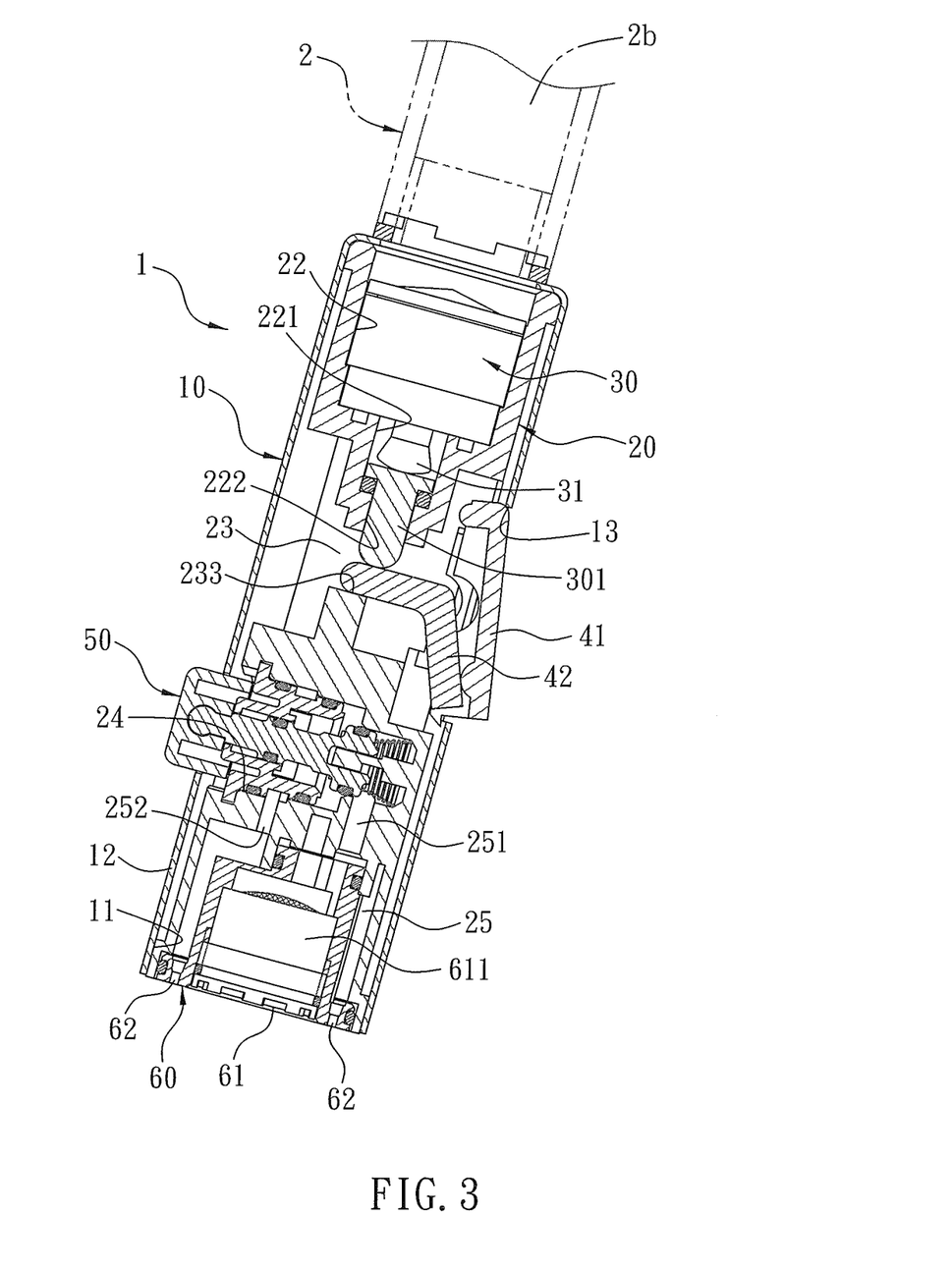
FIG. 3 is a cross sectional view taken along the line 1-1 of FIG. 2.
Figure 4:
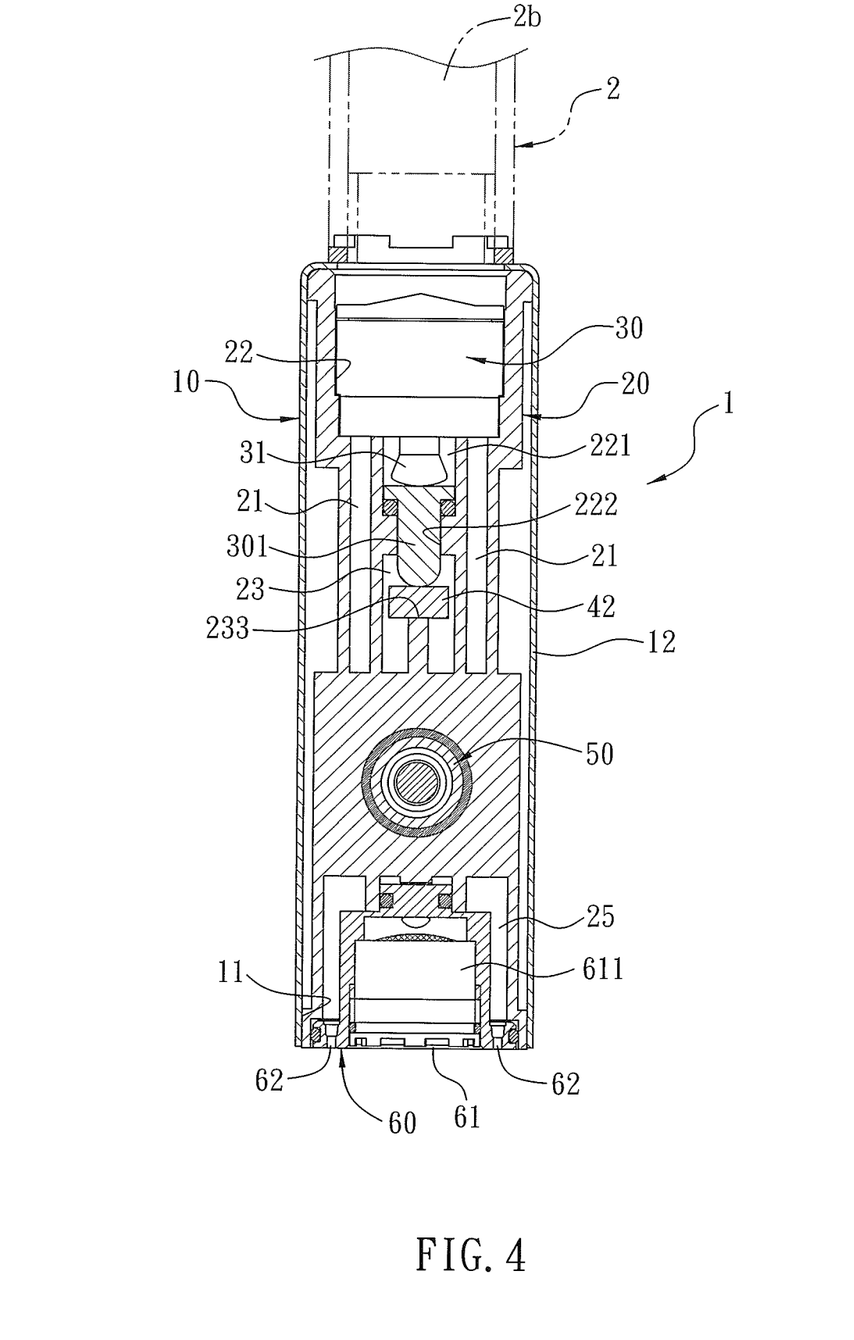
FIG. 4 is a cross sectional view taken along the line 2-2 of FIG. 2.
Figure 5:
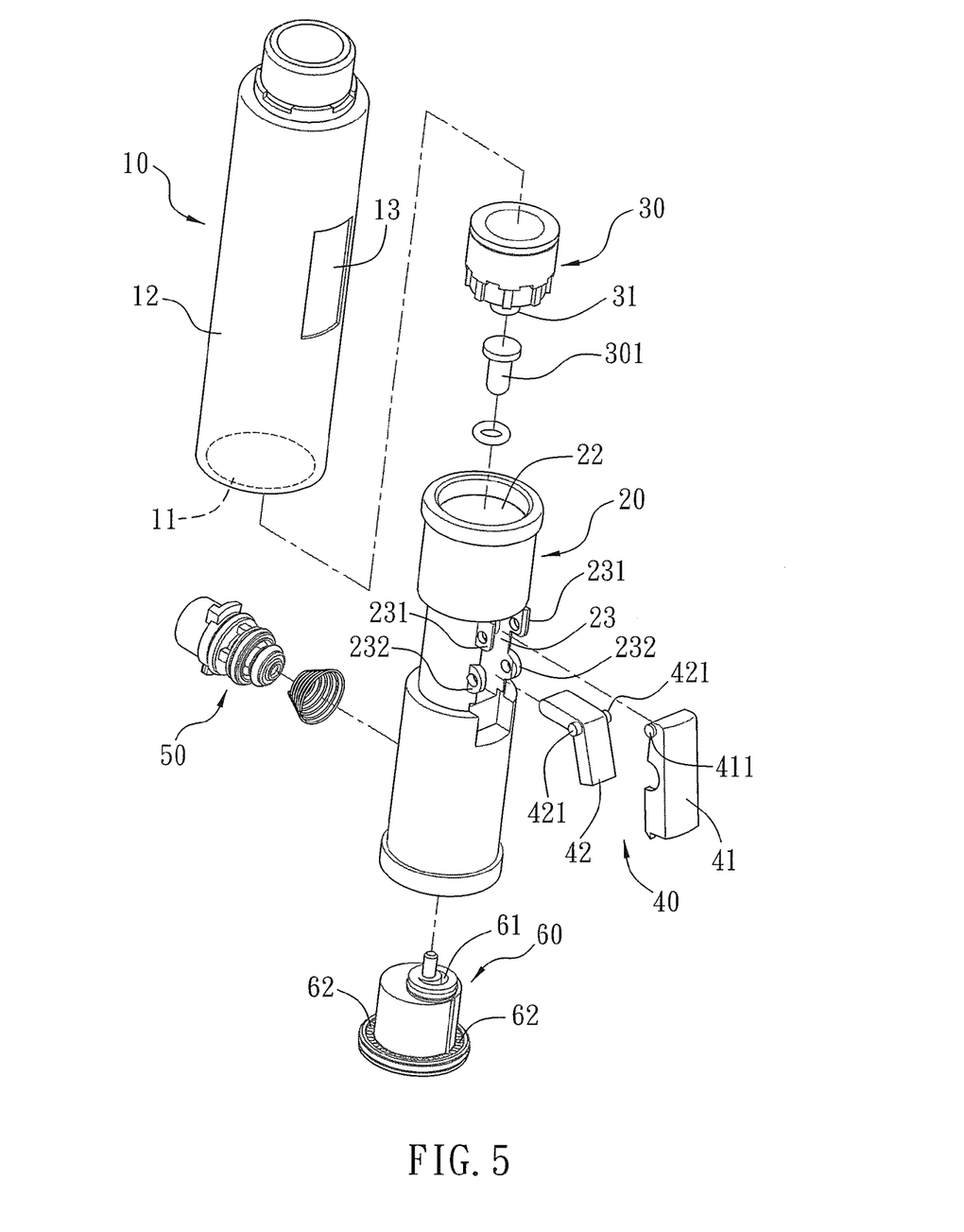
FIG. 5 is a perspective view showing the exploded components of the touch spray head according to the first embodiment of the present invention, wherein a dotted line denotes a water supply pipe connecting with the touch spray head.

The positioning member 20 further includes a second through orifice 23 corresponding to the opening 13 and configured to accommodate a part of the actuation device 40. The second through orifice 23 of the positioning member 20 has two opposite first tabs 231 and two opposite second tabs 232 which are in relation to the actuation device 40. The press member 41 has two first rotary shafts 411 fixed on two sides of one end thereof, respectively, so as to rotatably connect with the two opposite first tabs 231, individually. The driving member 42 has two second rotary shafts 421 mounted on two sides of the intermediate portion thereof, respectively, so as to rotatably couple with the two opposite second tabs 232, individually. The second through orifice 23 of the positioning member 20 further has a limiting fringe 233 formed therein so as to limit the second end of the driving member 42 between the limiting fringe 233 and the push post 301, as shown in FIGS. 3 and 8.

The touch spray head 1 further comprises a switching valve assembly 50 disposed on the positioning member 20 and configured to switch water supply mode of the touch spray head 1, and the touch spray head 1 further comprises a water spray assembly 60, such that the switching valve assembly 50 is pressed so that the water is guided to the water spray assembly 60 from the at least one first through orifice 21, thus spraying the water out of the touch spray head 1.

The positioning member 20 further includes a first cavity 24 communicating with the at least one first through orifice 21 and accommodating the switching valve assembly 50, and the positioning member 20 further includes a second cavity 25 configured to house the water spray assembly 60, wherein the second cavity 25 has a central conduit 251 and a peripheral conduit 252 which are in communication with the first cavity 24. Thereby, the switching valve assembly 25 is pressed so that the water is guided to flow out of a central nozzle 61 on a central portion of the water spray assembly 60 from the at least one first through orifice 21 via the central conduit 251 or is guided to flow out of multiple peripheral nozzles 62 around a peripheral wall of the water spray assembly 60 from the at least one first through orifice 21 via the peripheral conduit 252.

It is well-known that an aerator 611 is arranged on the central nozzle 61 so as to flow bubbled water from the central nozzle 61.

Preferably, the positioning member 20 of the touch spray head 1 is capable of only providing with a water spraying member so that the water flows out of the water spraying member directly from the at least one first through orifice 21.

The hole 11 is arranged on one end of the casing 10 away from the water supply pipe 2, hence the second cavity 25 of the positioning member 20 is opposite to the hole 11, and the water spray assembly 60 extends along the casing 10 so that the touch spray head 1 is adapted for the pull-down faucet.

Figure 16:
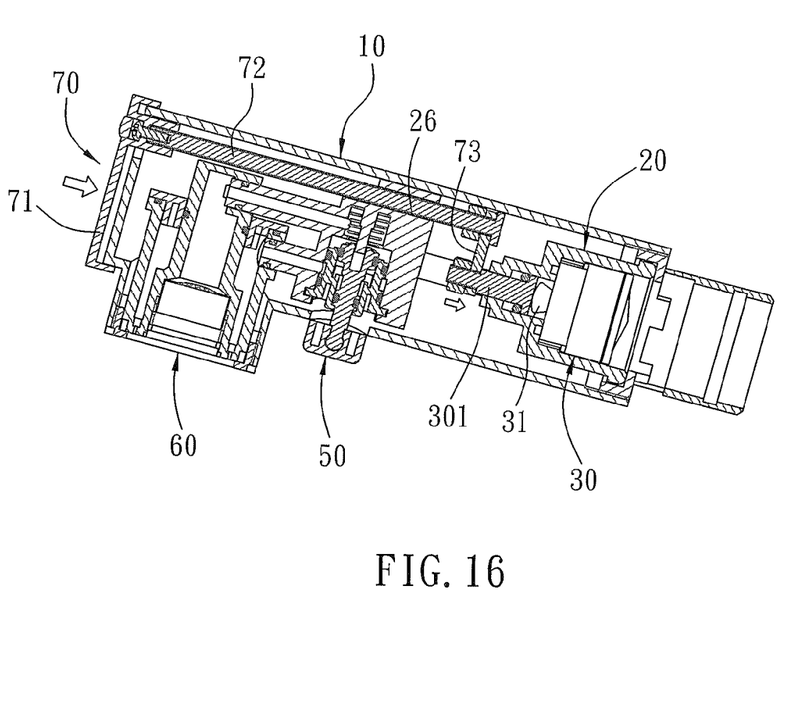
FIG. 16 is a cross sectional view showing the operation of an actuation device of the touch spray head according to the second embodiment of the present invention.

Referring to FIGS. 9 to 15, a difference of a touch spray head 1 of a second embodiment from that of the first embodiment comprises: an actuation device 70 which includes a press member 71 and a driving member 72, wherein the press member 71 is connected with a first end of the driving member 72, for example, the press member 71 is screwed with the first end of the driving member 72, and a second end of the driving member 72 is coupled with a push post 301, such that when the press member 71 is pressed, the driving member 72 is driven by the press member 71 to push the push post 301, and the push post 301 urges a movable stem 31 of a control valve 30 to move, as illustrated in FIG. 16.

The actuation device 70 further includes a connector 73, wherein a first end of the connector 73 locks with the second end of the driving member 72, and a second end of the connector 73 fits with the push post 301 so that the driving member 72 drives the push post 301 through the connector 73.

As shown in FIGS. 11 to 15, a positioning member 20 further includes a first passage 253 and a second passage 254 which communicate with a first cavity 24 of the positioning member 20. The touch spray head 1 of the second embodiment further comprises a water spray assembly 60 housed in a hole 11 of a casing 10, the water spray assembly 60 includes a central passageway 63 communicating with the first passage 253, and the water spray assembly 60 also includes a peripheral passageway 64 communicating with the second passage 254, such that water flows out of a central nozzle 61 via the central passageway 63, and the water flows out of multiple peripheral nozzles 62 via the peripheral passageway 64.

In this embodiment, the hole 11 of the casing 10 is arranged on a peripheral fence 12 of the casing 10, such that the water flows out of the water spray assembly 60 along the casing 10, so the touch spray head 1 is adapted for a pull-out faucet instead of the pull-down faucet of the first embodiment.

The casing 10 further includes an edge cliff 14 formed on one end thereof away from the water supply pipe 2, and the edge cliff 14 has a vent 141 defined thereon. The positioning member 20 includes an eyelet 26 arranged thereon, the press member 71 is in a cover shape and fits on the edge cliff 14, and the driving member 72 is in a rod shape and extends across the vent 141 and the eyelet 26.

When the control valve 30 is an automatic valve and its movable stem 31 is urged to move and turn on the control valve 30, the movable stem 31 moves back to its original position so as to turn off the control valve 30 after a period of using time, thus stopping water supply automatically. When the control valve 30 is a manual valve, the press members 41, 71 are pressed by the user so as to turn off the control valve 30 after a period of using time, thus stopping the water supply.

Preferably, the control valve 30 starts and stops the water supply randomly by way of the movable stem 31, after pressing the press members 41, 71, thus saving water consumption and operating the touch spray head 1 easily.

Furthermore, the press members 41, 71 are pressed by the user to drive the control valve 30, hence the control valve 30 is not directly touched by the user so as to avoid pollution of the water flowing through the control valve.

The water is guided to the water spray assembly 60 by using the control valve 30, and the switching valve assembly 50 is pressed so that the water is guided to flow out of the central nozzle 61 of the water spray assembly 60 or to flow out of the multiple peripheral nozzles 62 of the water spray assembly 60.

While the preferred embodiments of the invention have been set forth for the purpose of disclosure, modifications of the disclosed embodiments of the invention as well as other embodiments thereof may occur to water supply pipe skilled in the art. Accordingly, the appended claims are intended to cover all embodiments which do not depart from the spirit and scope of the invention.

What is claimed is:

1. A touch spray head being in connection with a water supply segment of a water supply pipe which is accommodated in a body of a faucet and includes a water channel; the touch spray head and the water supply pipe being pulled out of and retracted back to an outlet of the body, and the touch spray head comprising:
   a casing configured to be held and pulled by a user and including a hole arranged thereon;
   a positioning member secured in the casing and including at least one first through orifice formed thereon, and each of the at least one first through orifice communicating with the water channel of the water supply pipe and the hole of the casing;
   a control valve housed in the positioning member and including a movable stem configured to turn on the control valve, such that water flows to the at least one first through orifice of the positioning member from the water channel of the water supply pipe via the control valve; and
   an actuation device partially exposed outside the casing and being operated by the user so as to urge the movable stem of the control valve to move;
   wherein the actuation device includes a press member and a driving member; wherein a first end of the press member is rotatably connected with the positioning member, and a second end of the press member is limited in the casing; wherein an intermediate portion of the driving member is rotatably coupled with the positioning member, a first end of the driving member is abutted by the press member, and a second end of the driving member pushes the push post;
   wherein the casing includes a peripheral fence, an opening formed on the peripheral fence so that a part of the press member extends out of the opening to be pressed by the user;
   wherein the positioning member further includes a second through orifice corresponding to the opening and configured to accommodate a part of the actuation device; the second through orifice of the positioning member has two opposite first tabs and two opposite second tabs which are in relation to the actuation device; the press member has two first rotary shafts fixed on two sides of one end thereof, respectively, so as to rotatably connect with the two opposite first tabs, individually; the driving member has two second rotary shafts mounted on two sides of the intermediate portion thereof, respectively, so as to rotatably couple with the two opposite second tabs, individually.

2. The touch spray head as claimed in claim 1, wherein the positioning member includes an accommodation chamber, a housing groove defined on a bottom of the accommodation chamber, and an aperture passing through a bottom of the housing groove; the control valve is housed in the accommodation chamber, and the movable stem inserts into the housing groove.

3. The touch spray head as claimed in claim 2, wherein the control valve further includes a push post extending out of the housing groove via the aperture, such that the actuation device urges the push post to move the movable stem.

4. The touch spray head as claimed in claim 1, wherein the positioning member includes an accommodation chamber, a housing groove defined on a bottom of the accommodation chamber, and an aperture passing through a bottom of the housing groove; the control valve is housed in the accommodation chamber, and the movable stem inserts into the housing groove; wherein the control valve further includes a push post extending out of the housing groove via the aperture, such that the actuation device urges the push post to move the movable stem.

5. The touch spray head as claimed in claim 4, wherein the second through orifice of the positioning member further has a limiting fringe formed therein so as to limit the second end of the driving member between the limiting fringe and the push post.

6. The touch spray head as claimed in claim 1, wherein the touch spray head further comprises a switching valve assembly disposed on the positioning member and configured to switch water supply mode of the touch spray head, and the touch spray head further comprises a water spray assembly, such that the switching valve assembly is pressed so that the water is guided to the water spray assembly from the at least one first through orifice, thus spraying the water out of the touch spray head.

7. The touch spray head as claimed in claim 6, wherein the switching valve assembly is pressed so that the water is guided to flow out of a central portion of the water spray assembly or is guided to flow out around a peripheral wall of the water spray assembly.

8. The touch spray head as claimed in claim 7, wherein the positioning member further includes a first cavity communicating with the at least one first through orifice and accommodating the switching valve assembly; and the positioning member further includes a second cavity configured to house the water spray assembly, wherein the second cavity has a central conduit and a peripheral conduit which are in communication with the first cavity; the water spray assembly includes a central nozzle formed on the central portion thereof so as to flow the water out of the central nozzle; and the water spray assembly also includes multiple peripheral nozzles arranged around the peripheral wall thereof so as to flow the water out of the multiple peripheral nozzles.

9. The touch spray head as claimed in claim 8, wherein the hole is arranged on one end of the casing away from the water supply pipe, is at the same end as the second cavity.

* * * * *